US012530086B2

(12) United States Patent
Alvarez et al.

(10) Patent No.: US 12,530,086 B2
(45) Date of Patent: Jan. 20, 2026

(54) TRACTABLE BODY-BASED AR SYSTEM INPUT

(71) Applicant: Snap Inc., Santa Monica, CA (US)

(72) Inventors: Attila Alvarez, Budapest (HU); Márton Gergely Kajtár, Felsopakony (HU); Peter Pocsi, Budapest (HU); Jennica Pounds, Cape Coral, FL (US); David Retek, Dunaújváros (HU); Zsolt Robotka, Budapest (HU)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/964,770

(22) Filed: Oct. 12, 2022

(65) Prior Publication Data

US 2024/0126373 A1    Apr. 18, 2024

(51) Int. Cl.
*G06F 3/01*      (2006.01)
*G02B 27/01*    (2006.01)
(Continued)

(52) U.S. Cl.
CPC ......... *G06F 3/017* (2013.01); *G02B 27/0101* (2013.01); *G02B 27/017* (2013.01); *G06F 3/011* (2013.01); *G06T 7/251* (2017.01); *G06T 7/75* (2017.01); *G06V 40/10* (2022.01); *G06V 40/28* (2022.01); *G02B 2027/0138* (2013.01);
(Continued)

(58) Field of Classification Search
CPC ............ G06F 3/017; G06F 3/011; G06T 7/75; G06T 7/251; G06V 40/10; G06V 40/28; G02B 27/0101; G02B 27/017
See application file for complete search history.

(56) References Cited

U.S. PATENT DOCUMENTS 6,256,400 B1 *  7/2001  Takata ................... G06V 40/20
                                                           382/103
7,971,156 B2    6/2011  Albertson et al.
                        (Continued)

FOREIGN PATENT DOCUMENTS

CN    103049761         8/2016
CN    120035804 A       5/2025
                (Continued)

OTHER PUBLICATIONS

"International Application Serial No. PCT/US2023/034559, International Search Report mailed Jan. 31, 2024", 3 pgs.
(Continued)

*Primary Examiner* — William L Bashore
*Assistant Examiner* — Gregory A Distefano
(74) *Attorney, Agent, or Firm* — Schwegman Lundberg & Woessner, P.A.

(57) ABSTRACT

A hand-tracking platform generates gesture components for use as user inputs into an application of an Augmented Reality (AR) system. In some examples, the hand-tracking platform generates real-world scene environment frame data based on gestures being made by a user of the AR system using a camera component of the AR system. The hand-tracking platform recognizes a gesture component based on the real-world scene environment frame data and generates gesture component data based on the gesture component. The application utilizes the gesture component data as user input in a user interface of the application.

17 Claims, 9 Drawing Sheets

(51) Int. Cl.
*G06T 7/246* (2017.01)
*G06T 7/73* (2017.01)
*G06V 40/10* (2022.01)
*G06V 40/20* (2022.01)

(52) U.S. Cl.
CPC ............. *G02B 2027/014* (2013.01); *G02B 2027/0178* (2013.01); *G06T 2207/20044* (2013.01); *G06T 2207/30196* (2013.01)

(56) References Cited

U.S. PATENT DOCUMENTS

| | | | |
|---|---|---|---|
| 7,996,793 | B2 | 8/2011 | Latta et al. |
| 8,487,938 | B2 | 7/2013 | Latta et al. |
| 8,633,890 | B2* | 1/2014 | Tossell ................. G06F 3/0304 345/157 |
| 8,837,780 | B2* | 9/2014 | Jia ...................... G06V 10/143 382/103 |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |
| 9,705,831 | B2 | 7/2017 | Spiegel |
| 9,742,713 | B2 | 8/2017 | Spiegel et al. |
| 10,102,423 | B2 | 10/2018 | Shaburov et al. |
| 10,284,508 | B1 | 5/2019 | Allen et al. |
| 10,439,972 | B1 | 10/2019 | Spiegel et al. |
| 10,509,466 | B1 | 12/2019 | Miller et al. |
| 10,514,876 | B2 | 12/2019 | Sehn |
| 10,579,869 | B1 | 3/2020 | Xiong et al. |
| 10,614,855 | B2 | 4/2020 | Huang |
| 10,748,347 | B1 | 8/2020 | Li et al. |
| 10,958,608 | B1 | 3/2021 | Allen et al. |
| 10,962,809 | B1 | 3/2021 | Castañeda |
| 10,996,846 | B2 | 5/2021 | Robertson et al. |
| 10,997,787 | B2 | 5/2021 | Ge et al. |
| 11,012,390 | B1 | 5/2021 | Al Majid et al. |
| 11,030,454 | B1 | 6/2021 | Xiong et al. |
| 11,036,368 | B1 | 6/2021 | Al Majid et al. |
| 11,062,498 | B1 | 7/2021 | Voss et al. |
| 11,087,728 | B1 | 8/2021 | Canberk et al. |
| 11,092,998 | B1 | 8/2021 | Castañeda et al. |
| 11,106,342 | B1 | 8/2021 | Al Majid et al. |
| 11,126,206 | B2 | 9/2021 | Meisenholder et al. |
| 11,143,867 | B2 | 10/2021 | Rodriguez, II |
| 11,169,600 | B1 | 11/2021 | Canberk et al. |
| 11,227,626 | B1 | 1/2022 | Krishnan Gorumkonda et al. |
| 11,307,747 | B2 | 4/2022 | Dancie et al. |
| 11,531,402 | B1 | 12/2022 | Stolzenberg |
| 11,546,505 | B2 | 1/2023 | Canberk |
| 2003/0156756 | A1* | 8/2003 | Gokturk ................. G06V 40/11 382/190 |
| 2009/0012788 | A1 | 1/2009 | Gilbert et al. |
| 2011/0221974 | A1* | 9/2011 | Stern ..................... G06T 7/66 348/734 |
| 2011/0289455 | A1* | 11/2011 | Reville .................. G06F 3/011 715/830 |
| 2011/0301934 | A1 | 12/2011 | Tardif |
| 2012/0093360 | A1* | 4/2012 | Subramanian ....... G06V 10/143 382/103 |
| 2012/0275686 | A1* | 11/2012 | Wilson .................. G06T 17/00 382/154 |
| 2013/0326364 | A1* | 12/2013 | Latta .................... G06F 3/012 715/751 |
| 2014/0168059 | A1* | 6/2014 | Kim ...................... G06F 3/005 345/156 |
| 2014/0171036 | A1 | 6/2014 | Simmons |
| 2014/0184496 | A1* | 7/2014 | Gribetz ................. G06F 3/0482 345/156 |
| 2015/0062003 | A1* | 3/2015 | Rafii ..................... G02B 27/017 345/156 |
| 2015/0120293 | A1 | 4/2015 | Wohlert et al. |
| 2015/0123890 | A1* | 5/2015 | Kapur ................... G06F 3/011 345/156 |
| 2015/0346833 | A1* | 12/2015 | Jiang .................... G06F 3/015 345/158 |
| 2015/0370320 | A1 | 12/2015 | Connor |
| 2016/0026253 | A1 | 1/2016 | Bradski et al. |
| 2016/0078287 | A1* | 3/2016 | Auge ..................... G06V 20/49 382/103 |
| 2017/0123487 | A1 | 5/2017 | Hazra et al. |
| 2017/0168586 | A1* | 6/2017 | Sinha .................... G06N 20/00 |
| 2017/0236372 | A1* | 8/2017 | Bulzacki ............... G07F 17/32 463/43 |
| 2017/0249009 | A1* | 8/2017 | Parshionikar .......... G06F 3/017 |
| 2017/0277684 | A1 | 9/2017 | Dharmarajan Mary |
| 2017/0277685 | A1 | 9/2017 | Takumi |
| 2017/0351910 | A1 | 12/2017 | Elwazer et al. |
| 2018/0046363 | A1* | 2/2018 | Miller ................... G06F 3/012 |
| 2018/0158370 | A1 | 6/2018 | Pryor |
| 2019/0384405 | A1 | 12/2019 | Iyer et al. |
| 2020/0205900 | A1 | 7/2020 | Buckland et al. |
| 2020/0225758 | A1* | 7/2020 | Tang ..................... G06F 3/012 |
| 2021/0011612 | A1 | 1/2021 | Dancie et al. |
| 2021/0074016 | A1 | 3/2021 | Li et al. |
| 2021/0166732 | A1 | 6/2021 | Shaburova et al. |
| 2021/0174034 | A1 | 6/2021 | Retek et al. |
| 2021/0181856 | A1 | 6/2021 | Nguyen et al. |
| 2021/0241529 | A1 | 8/2021 | Cowburn et al. |
| 2021/0303075 | A1 | 9/2021 | Cowburn et al. |
| 2021/0303077 | A1 | 9/2021 | Anvaripour et al. |
| 2021/0303140 | A1 | 9/2021 | Mourkogiannis |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2022/0188539 | A1 | 6/2022 | Chan et al. |
| 2022/0206588 | A1 | 6/2022 | Canberk et al. |
| 2022/0300730 | A1 | 9/2022 | Eirinberg et al. |
| 2022/0300731 | A1 | 9/2022 | Eirinberg et al. |
| 2022/0326781 | A1 | 10/2022 | Hwang et al. |
| 2022/0334649 | A1 | 10/2022 | Hwang et al. |

FOREIGN PATENT DOCUMENTS

| | | |
|---|---|---|
| EP | 3707693 | 9/2020 |
| KR | 20220096877 A | 7/2022 |
| KR | 20220158824 A | 12/2022 |
| WO | 2016168591 | 10/2016 |
| WO | 2019094618 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | 2024081152 | 4/2024 |

OTHER PUBLICATIONS

"International Application Serial No. PCT/US2023/034559, Written Opinion mailed Jan. 31, 2024", 4 pgs.

"International Application Serial No. PCT/US2023/034559, International Preliminary Report on Patentability mailed Apr. 24, 2025", 6 pgs.

* cited by examiner

TABLE 1

432

| UNKNOWN | 0_NUM | 1_NUM | 1_BENT | 1_BENT_THUMB_OUT | 2_NUM |
|---|---|---|---|---|---|
| 3_NUM | 3_CLOSED | 4_NUM | 5_NUM | 5_CLAW | 5_CLAW_THUMB_OUT |
| 6_NUM | 6_CLOSED | 7_NUM | 8_NUM | 9_FLAT | 9_NUM |
| 10 | 25 | A | B | B_FLAT | B_THUMB_OUT |
| B_BENT | B_BENT_THUMB_OUT | C | D | E | E_THUMB_OUT |
| G | G_CLOSED | G_INDEX_CURVED | G_OPEN | I | K |
| L | M | M_OPEN | N | N_OPEN | O_FLAT |
| R | R_THUMB_OUT | S | T | U | U_THUMB_FORWARD |
| U_THUMB_OUT | V_CIRCLE | X | X_OVER_THUMB | X_THUMB_OUT | Y |
| Y_OPEN | HORNS | ILY | E_OPEN | U_CIRCLE_THUMB_FORWARD_CIRCLE | 1_NUM_GUN |
| U_GUN | N_OPEN_THUMB_OUT | O_RING_PINKY | 8_NUM_FLAT_RING_PINKY | 1_BENT_THUMB_CROSS | U_BENT_THUMB_CROSS |
| U_CIRCLE | U_BENT | | | | |

FIG. 4B

TRACTABLE BODY-BASED AR SYSTEM INPUT

TECHNICAL FIELD

The present disclosure relates generally to user interfaces and more particularly to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term AR refers to augmented reality, virtual reality and any of hybrids of these technologies unless the context indicates otherwise.

A user of the head-worn device may access and use computer software applications to perform various tasks or engage in an entertaining activity. Performing the tasks or engaging in the entertaining activity may require entry of various commands and text into the head-worn device. Therefore, it is desirable to have a mechanism for entering commands and text.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4B illustrates a data structure in accordance with some examples.

DETAILED DESCRIPTION

Figure 1:
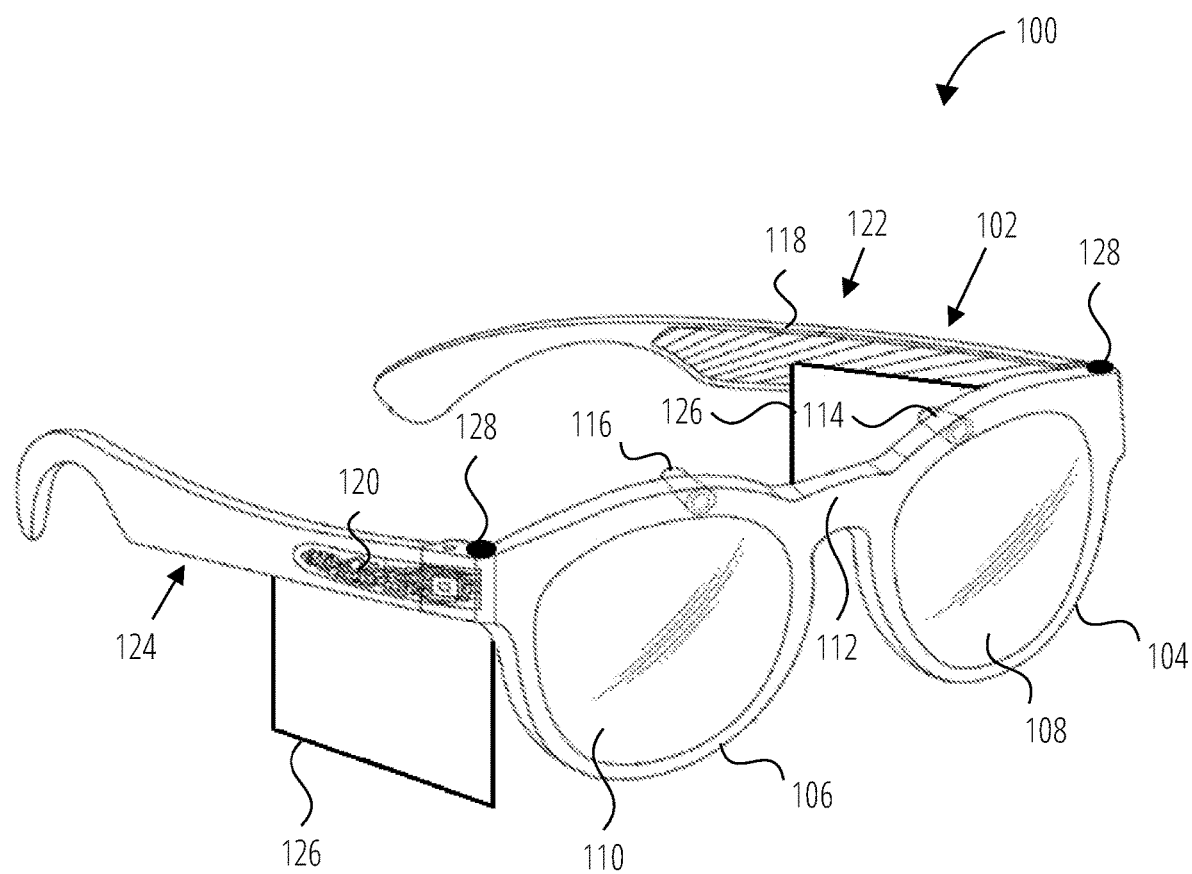
FIG. 1 is a perspective view of a head-worn device, in accordance with some examples.

AR systems implemented on a head-worn device such as glasses are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it is desirable to have input modalities that would allow for a greater range of inputs that could be utilized by a user to indicate their intent through a user input. Computer vision-based hand-tracking provides such input modalities.

An example of a hand-tracking input modality that may be utilized with AR systems is hand-tracking combined with Direct Manipulation of Virtual Objects (DMVO). In DMVO methodologies, a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene environment while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

Gestures that do not involve DMVO provide another hand-tracking input modality suitable for use with AR systems. Gestures are made by a user moving and positioning portions of the user's body while those portions of the user's body are detectable by an AR system while the user is wearing the AR system. The detectable portions of the user's body may include portions of the user's upper body, arms, hands, fingers, and direction of gaze. Gesture components may include the movement of the user's arms, hands and fingers, location of the user's arms and hands in space, and positions or configurations in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene environment through the lenses of the AR system, view an AR overlay on the real-world scene environment view of the machinery, and provide user inputs into the AR system.

Body based input has complexity and significant noise from the high variance of presentation of movements from different users and also variance in body proportions and other environmental aspects, such as clothing and accessories. Decomposing the input into gesture components in a way that matches user intention and inherent physical limitations limits accumulation of noise from independent aspects, and allows metrics to be natural and well-aligned with user intentions. Gestures and any body based input is still present the gesture components, but represented in a more natural manner and thus with more tractable noise structure.

In some examples, a gesture component framework maps the intentions of the users in a structured way. Gestures naturally exist in various abstraction levels including by user intention depending on context. To support this, a gesture component framework includes matching layers and hierarchy. For example, in a given context a specific handshape in a specific orientation can be a meaningful gesture. In other examples, a change or deformation in the handshape or finger configuration can be a meaningful gesture. In some examples, movement or a change orientation can be meaningful gestures.

In some examples, a gesture component framework combines gesture intentions, structure, and grammar aspects of gestures that an application of an AR system can use. Such a gesture component framework addresses user intention and parsable information.

In some examples, components of the gesture component framework extract lower abstraction level features from a user input that are decomposed into physically and intentionally founded gesture components. Some gesture components may be momentary in nature, such as handshape (finger configuration), orientation, (relative) location, symmetry (and asymmetry) components. Some gesture components may have a longer time span, such as movement components, and certain (movement) symmetry components.

In some examples, components of the gesture component framework extract gesture components that exhibit redundancy as they represent intentional and physical aspects that have cross-correlation.

Other technical features may be readily apparent to one skilled in the art from the following figures, descriptions, and claims.

FIG. 1 is a perspective view of a head-worn AR system (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples the frame 102 can be formed from a single piece of material so as to have a unitary or integral construction.

The glasses 100 can include a computing system, such as a computer 120, which can be of any suitable type so as to be carried by the frame 102 and, in one or more examples, of a suitable size and shape, so as to be partially disposed in one of the temple piece 122 or the temple piece 124. The computer 120 can include multiple processors, memory, and various communication components sharing a common power source. As discussed below, various components of the computer 120 may comprise low-power circuitry, high-speed circuitry, and a display processor. Various other examples may include these elements in different configurations or integrated together in different ways. Additional details of aspects of the computer 120 may be implemented as illustrated by the data processor 702 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene environment scene.

The glasses 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
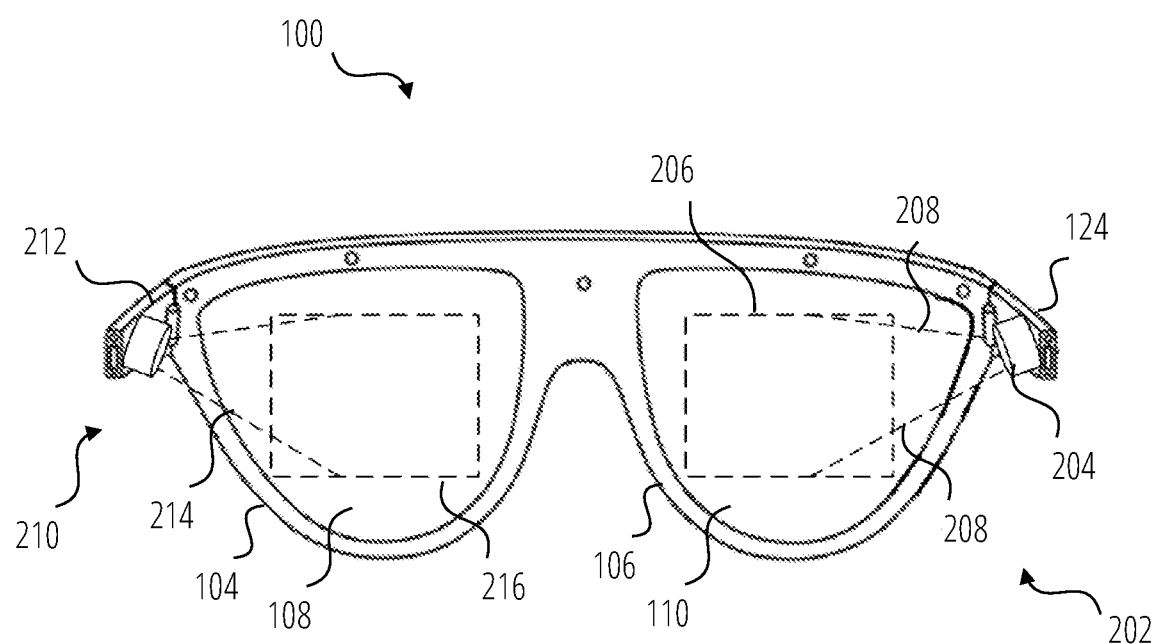
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene environment seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene environment seen by the user. The combination of a GPU, the forward optical assembly 202, the left optical element 108, and the right optical element 110 provide an optical engine of the glasses 100. The glasses 100 use the optical engine to generate an overlay of the real-world scene environment view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g. client device 726 illustrated in FIG. 7), gaze direction, and/or hand and movements, locations, and positions detected by the glasses 100.

Figure 3:
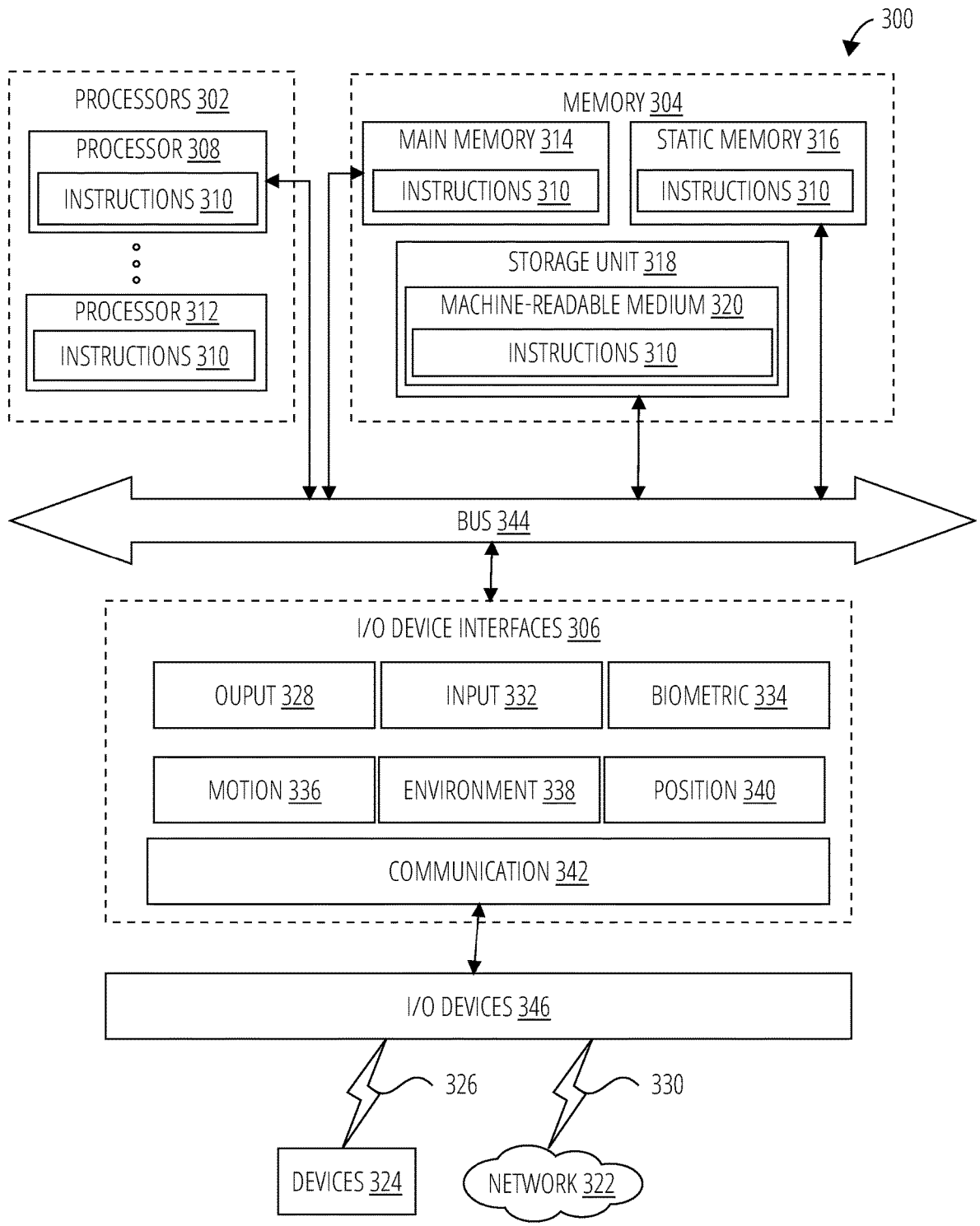
FIG. 3 is a diagrammatic representation of a machine within which a set of instructions may be executed for causing the machine to perform any one or more of the methodologies discussed herein in accordance with some examples.

FIG. 3 is a diagrammatic representation of a machine 300 within which instructions 310 (e.g., software, a program, an application, an applet, an app, or other executable code) for causing the machine 300 to perform any one or more of the methodologies discussed herein may be executed. The machine 300 may be utilized as a computer 120 of an AR system such as glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 in conjunction with other components of the AR system may function as, but not is not limited to, a server, a client, computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O device interfaces 306, which may be configured to communicate with one another via a bus 344. In an example, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within a non-transitory machine-readable medium 320 within the storage unit 318, within one or more of the processors 302 (e.g., within the processor's cache memory), or any suitable combination thereof, during execution thereof by the machine 300.

The I/O device interfaces 306 couple the machine 300 to I/O devices 346. One or more of the I/O devices 346 may be a component of machine 300 or may be separate devices. The I/O device interfaces 306 may include a wide variety of interfaces to the I/O devices 346 used by the machine 300 to receive input, provide output, produce output, transmit information, exchange information, capture measurements, and so on. The specific I/O device interfaces 306 that are included in a particular machine will depend on the type of machine. It will be appreciated that the I/O device interfaces 306 the I/O devices 346 may include many other components that are not shown in FIG. 3. In various examples, the I/O device interfaces 306 may include output component interfaces 328 and input component interfaces 332. The output component interfaces 328 may include interfaces to visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input component interfaces 332 may include interfaces to alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O device interfaces 306 may include biometric component interfaces 334, motion component interfaces 336, environmental component interfaces 338, or position component interfaces 340, among a wide array of other component interfaces. For example, the biometric component interfaces 334 may include interfaces to components used to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion component interfaces 336 may include interfaces to inertial measurement units (IMUs), acceleration sensor components (e.g., accelerometer), gravitation sensor components, rotation sensor components (e.g., gyroscope), and so forth. The environmental component interfaces 338 may include, for example, interfaces to illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position component interfaces 340 include interfaces to location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O device interfaces 306 further include communication component interfaces 342 operable to couple the machine 300 to a network 322 or devices 324 via a coupling 330 and a coupling 326, respectively. For example, the communication component interfaces 342 may include an interface to a network interface component or another suitable device to interface with the network 322. In further examples, the communication component interfaces 342 may include interfaces to wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication component interfaces 342 may include interfaces to components operable to detect identifiers. For example, the communication component interfaces 342 may include interfaces to Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication component interfaces 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication component interfaces 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
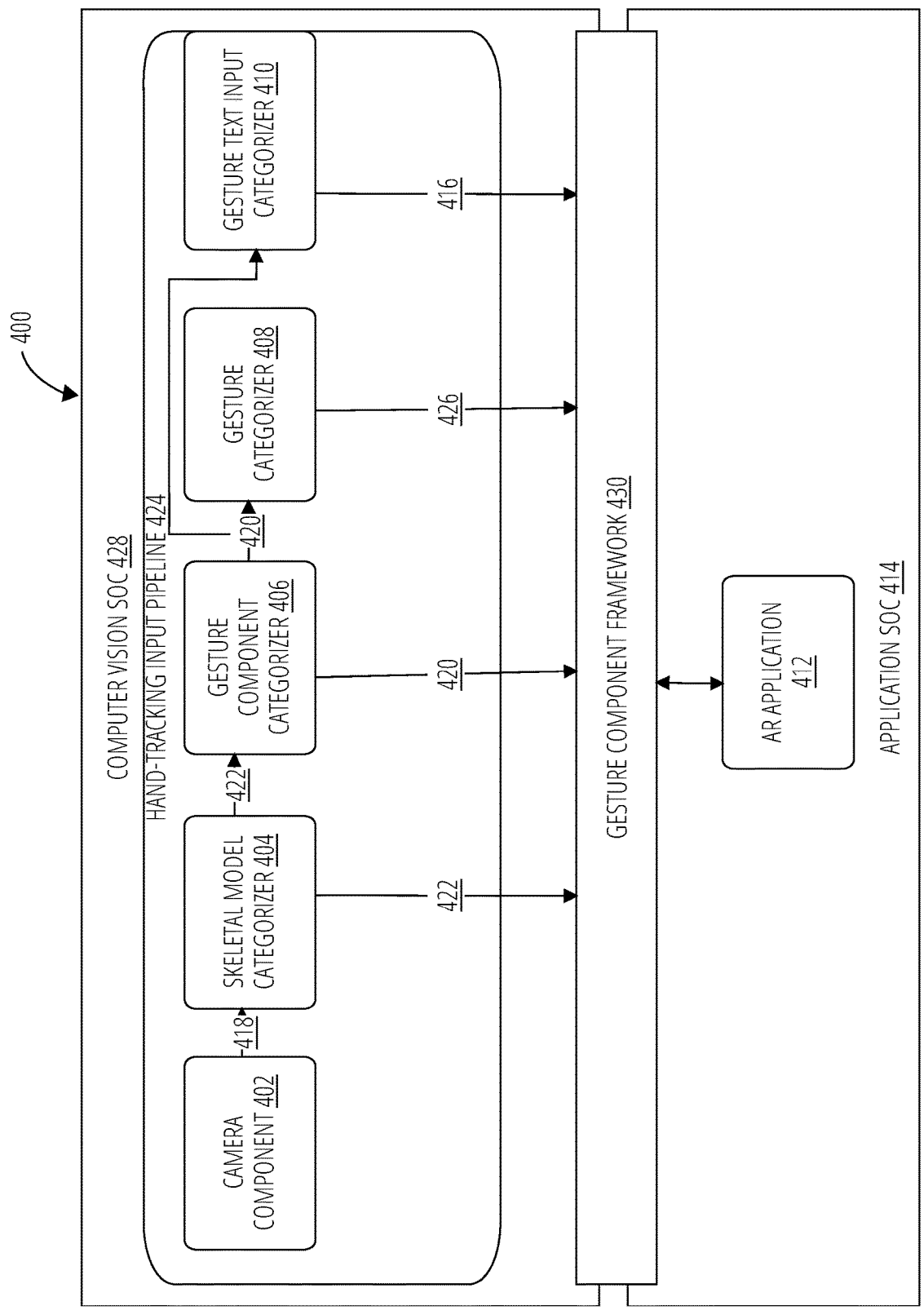
FIG. 4A is collaboration diagram of a hand-tracking platform for an AR system in accordance with some examples.

FIG. 4A is collaboration diagram of a hand-tracking platform 400 for an AR system, such as glasses 100, and FIG. 4B illustrates a data structure in accordance with some examples. The hand-tracking platform 400 includes a computer vision SoC 428 that hosts a hand-tracking input pipeline 424 used for processing hand-tracking inputs into the AR system and one or more application SoCs 414 that host AR applications, such as AR application 412, that are provided to a user of the AR system. The hand-tracking platform 400 also includes a gesture component framework 430 that provides one or more Application Programming Interfaces (APIs) that provide communication channels between components of the hand-tracking input pipeline 424 and the AR application 412. In some examples, an application SoC 414 of the one or more application SoCs functions as a core processing system for the AR system and hosts an operating system of the AR system.

The hand-tracking input pipeline 424 includes a camera component 402, such as cameras 114 and 116 of FIG. 1, that captures video frame data of a real-world scene environment from a perspective of a user of the AR system and generates tracking video frame data 418 based on the captured video frame data. The tracking video frame data 418 includes tracking video frame data of detectable portions of the user's body including portions of the user's upper body, arms, hands, and fingers as the user makes gestures. The tracking video frame data includes video frame data of movement of portions of the user's upper body, arms, and hands as the user makes a gesture or moves their hands and fingers to interact with a real-world scene environment; video frame data of locations of the user's arms and hands in space as the user makes a gesture or moves their hands and fingers to interact with the real-world scene environment; and video frame data of positions in which the user holds their upper body, arms, hands, and fingers as the user makes a gesture or moves their hands and fingers to interact with the real-world scene environment. The camera component 402 communicates the tracking video frame data 418 to a skeletal model categorizer 404.

The skeletal model categorizer 404 recognizes landmark features based on the tracking video frame data 418. The skeletal model categorizer 404 generates skeletal model data 422 based on the recognized landmark features. The landmark features include landmarks on portions of the user's upper body, arms, and hands in the real-world scene environment. The skeletal model data 422 includes data of a skeletal model representing portions of the user's body such as their hands and arms. In some examples, the skeletal model data 422 also includes landmark data such as landmark identification, location in the real-world scene environment, segments between joints, and categorization information of one or more landmarks associated with the user's upper body, arms, and hands.

In some examples, the skeletal model categorizer 404 recognizes landmark features based on the tracking video frame data 418 using artificial intelligence methodologies and a skeletal classifier model previously generated using machine learning methodologies. In some examples, a skeletal classifier model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies may include, but are not limited to, supervised learning, unsupervised learning, semi-supervised learning, reinforcement learning, dimensionality reduction, self-learning, feature learning, sparse dictionary learning, and anomaly detection.

In some examples, the skeletal model categorizer 404 recognizes joint features and generates low level joint gesture components representing joints of the user. These can be virtual representations of natural joint positions on the user's body, such as, but not limited to fingertips, finger joints, wrists, elbows, shoulders, and so forth. A 3D marker that can be defined on the user is included in this category, even if it does not relate to a physical joint.

The skeletal model categorizer 404 communicates the skeletal model data 422 to the gesture component categorizer 406. In some examples, the skeletal model categorizer 404 communicates the skeletal model data 422 to the AR application 412 in accordance with an API of the gesture component framework 430.

The gesture component categorizer 406 receives the skeletal model data 422 from the skeletal model categorizer 404 and recognizes gesture components based on the skeletal model data 422. The gesture component categorizer 406 generates gesture component data 420 based on the recognized gesture components. The gesture component data 420 includes data of recognized gesture components including an identification of the recognized gesture components.

In some examples, the gesture component data 420 includes confidence values indicating a degree of confidence that a specific gesture component was recognized as being in the skeletal model data 422. While individual variances may occur, the gesture component categorizer 406 evaluates each handshape gesture component individually to match the user's momentary handshape or hand configuration, and provides a confidence in doing so (e.g., 0.0 confidence matching indicates that the user's hand does not match the handshape at all, 1.0 confidence matching indicates that the user's hand matches the handshape perfectly). In some examples, the gesture component categorizer 406 scales the confidence values so a specified value represents a natural boundary between a discrete acceptance or nonacceptance of a handshape matching the user's hand. For example, a threshold value of 0.5 can be used as the natural boundary. A recognized handshape having a confidence value of 0.5 or greater is accepted as a matching handshape. A recognized handshape having a confidence value of less than 0.5 is not accepted as a matching handshape. In some examples, the gesture component categorizer 406 includes individual confidence values in the gesture component data 420 if a finer decision is desired. In some examples, the gesture component categorizer 406 provides the gesture component data 420 to other applications so that the other applications may evaluate a broader set of handshapes based on individual confidence values.

In some examples, the gesture component categorizer 406 recognizes handshape gesture components composed of handshape features in the skeletal model data 422 that are distinct configurations of a user's hand. Handshape gesture components include finger configurations (bendedness, tiltness and relative position) for a given hand of the user. In some examples, the gesture component categorizer 406 recognizes a defined subset of a set of possible handshapes where the subset of possible handshapes is based on a use case.

In some examples, the gesture component categorizer 406 recognizes handshape gesture components composed of redundant features in the skeletal model data 422. In some examples, the gesture component categorizer 406 does not treat handshape gesture components as disjoint categories of finger configurations but as clusters of accepted such configurations. This means that a defined set of handshape gesture components may contain handshape gesture components that by intention are exclusive such that if a handshape gesture component is accepted/recognized, then no other handshape should be accepted/recognized. The defined set of handshape gesture components, however may also contain other handshape gesture components that are redundant, such as those handshape gesture components that intersect in intention or where one handshape gesture component is strictly more specific than another.

FIG. 4A illustrates Table 1 432 listing examples of gesture component identifications for handshape gesture components in accordance with some examples. These provide a level of detailedness for many use cases, and can be grouped into broader categories.

For example, for a pinching gesture (using thumb and index finger) a reasonable group of handshapes is G, G_CLOSED, G_INDEX_CURVED, G_OPEN, 0_NUM, O_RING_PINKY, O_FLAT, 9_NUM, 9_FLAT.

As another example, a swipe gesture may be recognized using a handshape group containing B, B_FLAT, B_THUMBOUT, B_BENT, B_BENT_THUMBOUT, C.

In some examples, the gesture component categorizer 406 recognizes best matched gesture components on the basis of determining a best matched gesture component to features of the skeletal model data 422. For example, the gesture component categorizer 406 determines a most likely matched gesture component or group at a given moment for the given hand.

In some examples, the gesture component categorizer 406 recognizes gesture components based on grouping gesture components and then recognizing a member of the group when any member of the group is recognized in the skeletal model data 422. For example, groups of gesture components are defined by a developer of the AR system, and the defined groups are used as gesture components that are the union of the gesture components in a group, that is, the group is recognized if a gesture component in the group is recognized. In some examples, the gesture component categorizer 406 uses definitions of gesture components and groups to determine a user intention to make a specific finger configuration.

In some examples, the gesture component categorizer 406 recognizes space gesture components composed of spatial data features of the skeletal model data 422. Space gesture components are a specific aspect any spatial data that can be visually perceived. For example, useful reference space gesture components are defined that make data more informative. Described 3D data can be transformed into these space gesture components. These space gesture components also provide natural choices of discretization for certain data. For example, hand positions can be discretized into categories of natural, expanded, and retracted in a space relative to the user's body, and even more, if it is normalized by current arm length or shoulder width.

In some examples, the gesture component categorizer 406 recognizes derived continuous gesture components composed of derived continuous features of the skeletal model data 422. Derived continuous features are features that can be extracted at multiple timestamps and hence form a continuous stream of data. In some examples, derived continuous feature gesture components include a specified level of smoothing.

In some examples, the gesture component categorizer 406 recognizes distance gesture components composed of distance features of the skeletal model data 422. Distance features are derived from distances between two or more specified points of the user's body, such as, but not limited to, fingertips, palms, backs of the hand, wrists (inner side, outer side, inner and outer edge), ends of a fist, and so forth. In addition, the specified points may also include portions of the user's body not on the hands, such as, but not limited to, the face, the upper body, and the like.

In some examples, the gesture component categorizer 406 recognizes symmetry gesture components composed of symmetry features of the skeletal model data 422. A symmetry feature describes complete or partial symmetry included in hand data that is continuously defined at a sequence of timestamps. Symmetry features extract information that is not related to position or movement and can be used as a metric to express how precisely one hand's shape is a reflection of the other hand's shape.

In some examples, the gesture component categorizer 406 recognizes movement gesture components composed of movement markers of the skeletal model data 422. A movement marker is a continuous 3D trajectory determined for a hand that is optimized for a shape of the 3D trajectory. In some examples, a movement marker may have a local offset for a short time versus a specified 3D trajectory model, which diminishes over time, but the overall movement of the hand will still match the 3D trajectory model of the movement marker in geometrical attributes and shape.

In some examples, the gesture component categorizer 406 recognizes position gesture components composed of position markers of the skeletal model data 422. In contrast to a movement marker, a position marker is optimized for a position of a user's hand. A position marker feature is consistent, and is responsive to movement of the user's hand. It may have artifacts caused by a trajectory of movement of the user's hand as minimal latency of the detection of the position marker feature is prioritized over accuracy of position of the user's hand.

In some examples, the gesture component categorizer 406 recognizes interaction gesture components composed of interaction markers of the skeletal model data 422. An interaction marker is a specific movement marker of the hand that targets natural points of interaction based on a handshape. For example, a movement marker may comprise a measurement of a farthest point of the user's fingers from a respective wrist. For example, a furthest point may be an index finger tip when pointing with the index finger, middle finger tip, if pointing with the index and middle finger opened, or with a flat hand.

In some examples, the gesture component categorizer 406 recognizes rotation gesture components composed of rotation markers of the skeletal model data 422. A rotation marker is similar to a position marker, but composed of a 3D rotation of a hand at a given time. This 3D rotation together with a position marker defines a rigid transformation that the hand describes.

In some examples, the gesture component categorizer 406 recognizes delta motion gesture components composed of delta motion markers of the skeletal model data 422. A delta motion marker describes an amount of a rotation of a handshape, position, and/or rotation changes. In some examples, the fact that there was a change in a handshape or configuration, but not the specific change, is sufficient for recognition. For example, at an end of a gesture held for a period of time followed by another gesture indicating a release of the held gesture.

In some examples, the gesture component categorizer 406 recognizes pinch gesture components composed of tightness of pinch markers of the skeletal model data 422. A tightness of pinch marker is a continuous evaluation of how much a pinch or grab hand position is closed.

In some examples, the gesture component categorizer 406 recognizes temporal segment gesture components on the basis of temporal segmentation of the skeletal model data 422. Temporal segments vary from gesture to gesture. The data used to determine temporal segments is continuous in order to capture temporal features. In some examples, for manual gestures, a choice of temporal segmentation is based on a general movement of a hand. For example, the gesture component categorizer 406 detects local extrema of a curvature of a movement of a hand and uses a sequence of two local extrema to determine segment boundaries and a segment interval in between the two local extrema.

In some examples, the gesture component categorizer 406 recognizes aggregate gesture components of the skeletal model data 422 on the basis of aggregating multiple gesture components across multiple temporal segment boundaries. In this way, simple position continuous features can be aggregated resulting in a position being recognized across one or more temporal segment boundaries, and similarly within one or more temporal segment intervals.

In some examples, the gesture component categorizer 406 recognizes continuous movement gesture components composed of continuous movement temporal segments of the skeletal model data 422. Continuous movement temporal segments are temporal segments with definite movement gesture components and their derivatives recognized as additional features, such as a displacement of a hand or a velocity of a hand.

A pause or no movement is a type of continuous movement temporal segment. A pause comprises a temporal segment where there is little movement of the user's hand. A pause may also indicate a hold. In some examples, a pause has no additional features other than its duration.

A simple movement is a type of continuous movement temporal segment where a special production, such as a hand position, of the movement is not relevant, only a displacement and a duration. For example, a broad sweeping motion with the arm where the hand position is unimportant is a simple movement. Additional features can include, but are not limited to, a displacement vector, an average velocity, and a peak velocity.

An arced movement is a type of continuous movement temporal segment with a measurable arc within an intended gesture movement. For example, a stepping movement contains a measurable and distinctive vertical movement. Additional features of an arced movement can include the additional features of a simple movement and may also include a direction and an amplitude of the arc.

An articulate start or stop movement is a type of continuous movement temporal segment with an abrupt beginning movement or an abrupt stop to a movement. An articulate start or stop's salient feature is a starting, or stopping movement that has an abrupt start or end where the acceleration is not uniform. For example, pointing at something with a definite halt that has a start of the movement that is arbitrary and vague, but has an end that is sharp. As another example, a flicking gesture is an example of the opposite (starting) movement where a start is definite, and an end is indefinite.

A complex movement is a type of a continuous movement temporal segment spanning multiple temporal segments with significant consistency such as, but not limited to, a repeated (or back-and-forth) movements, shakes, and the like. In some examples, a complex movement may also include an additional feature such as, but not limited to, a repetition count, an amplitude, a frequency of repetition, and so forth.

In some examples, the gesture component categorizer 406 uses geometric methodologies to compare one or more skeletal models included in skeletal model data 422 to previously generated gesture component models and generates the gesture component data 420 including recognized gesture components on the basis of the comparison.

In some examples, the gesture component categorizer 406 recognizes gesture components based on the skeletal model data 422 using artificial intelligence methodologies and a gesture component model previously generated using machine learning methodologies. In some examples, a gesture component model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

The gesture component categorizer 406 communicates the gesture component data 420 to a gesture categorizer 408 and a gesture text input categorizer 410. In some examples, the gesture component categorizer 406 communicates the gesture component data 420 to the AR application 412 using an API of the gesture component framework 430.

The gesture categorizer 408 receives the gesture component data 420 and recognizes gestures based on the gesture component data 420. The gesture categorizer 408 generates gesture input event data 426 based on the recognized gestures. In some examples, the gesture categorizer 408 recognizes gestures on the basis of a comparison of gesture components identified in the gesture component data 420 to gesture identification models identifying specific gestures. For example, with reference to Table 1, for a pinching gesture (using thumb and index finger), possible handshape gesture component include G, G_CLOSED, G_INDEX_CURVED, G_OPEN, 0_NUM, O_RING_PINKY, O_FLAT, 9_NUM, 9_FLAT.

In some examples, the gesture categorizer 408 recognizes gestures based on the gesture component data 420 using artificial intelligence methodologies and one or more gesture models previously generated using machine learning methodologies. In some examples, a gesture model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

In some examples, the gesture categorizer 408 recognizes gestures on the basis of parsing the gesture component data 420 using a previously determined gesture grammar.

The gesture text input categorizer 410 also receives the gesture component data 420 from the gesture component categorizer 406. The gesture text input categorizer 410 recognizes symbols based on the gesture component data 420. The gesture text input categorizer 410 generates symbol input event data 416 based on the recognized symbols. In some examples, the gesture categorizer 408 recognizes symbols on the basis of a comparison of gesture components in the gesture component data 420 to symbol models identifying specific characters, words, and commands.

In some examples, the gesture text input categorizer 410 recognizes symbols based on the gesture component data 420 using artificial intelligence methodologies and one or more symbol models previously generated using machine learning methodologies. In some examples, a symbol model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

In some examples, the gesture text input categorizer 410 recognizes symbols on the basis of parsing the gesture component data 420 using a previously determined symbol grammar.

In some examples, the gesture text input categorizer 410 communicates the symbol input event data 416 to the AR application 412 using an API of the gesture component framework 430.

AR applications executed by the AR system, such as AR application 412, are consumers of the data generated by the hand-tracking input pipeline 424. The AR system executes the AR application 412 to provide a user interface to a user of the AR system, such as an AR experience, utilizing skeletal model data 422, gesture component data 420, gesture input event data 426, and symbol input event data 416 as input modalities depending on the purpose of the AR application 412.

In some examples, components of the AR system that are hosted by the computer vision SoC 428, such as the camera component 402 and the skeletal model categorizer 404, communicate using a shared-memory buffer. In some examples, the skeletal model categorizer 404 publishes the skeletal model data 422 on a shared-memory buffer that is accessible by components outside of the hand-tracking input pipeline 424 and hosted by an application SoC 414, such as the AR application 412.

In some examples, components of the AR system that are hosted by the computer vision SoC 428, such as the gesture component categorizer 406, the gesture categorizer 408, and the gesture text input categorizer 410, communicate data, such as the gesture component data 420, the gesture input event data 426, and the symbol input event data 416, respectively, using IPC methodologies within the computer vision SoC 428 and to components of the AR system that are hosted by an application SoC 414.

In some examples, components of the AR system that are hosted by an application SoC 414 communicate data using IPC method calls with components that are hosted by the computer vision SoC 428.

In some examples, the hand-tracking input pipeline 424 continuously generates and publishes the symbol input event data 416, the gesture input event data 426, the skeletal model data 422, and the skeletal model data 422 based on the tracking video frame data 418 generated by the one or more cameras of the AR system.

In some examples, any of the camera component 402, the skeletal model categorizer 404, the gesture component categorizer 406, the gesture categorizer 408, and/or the gesture text input categorizer 410 may use lazy evaluation where given gesture components are only evaluated in an on demand manner, and only registered events (and their requirements) are calculated.

In some examples, the hand-tracking platform 400 uses discretized and/or higher level features and events, such as discrete orientations for gesture components, or high level handshape events, thus avoiding any user specific features that could otherwise be used for user identification. Similarly features like the abstract and derived movement markers can provide fine granularity input data, similar to mouse movement, while sharing minimal amounts of data. No biometric data, such as hand or finger size, can be derived if the communication is restricted to an appropriate subset of the gesture components corresponding to an application's needs.

In some examples, the gesture component categorizer 406 recognizes gesture components based on the tracking video frame data 418 directly without taking an intermediate step of using the skeletal model categorizer 404 to generate skeletal model data 422. In some examples, the gesture component categorizer 406 recognizes gesture components based on the tracking video frame data 418 using artificial intelligence methodologies and a gesture component model previously generated using machine learning methodologies. In some examples, a gesture component model comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies include, but are not limited to, supervised learning, unsupervised learning, semi-supervised learning, reinforcement learning, dimensionality reduction, self-learning, feature learning, sparse dictionary learning, and anomaly detection.

Figure 5:
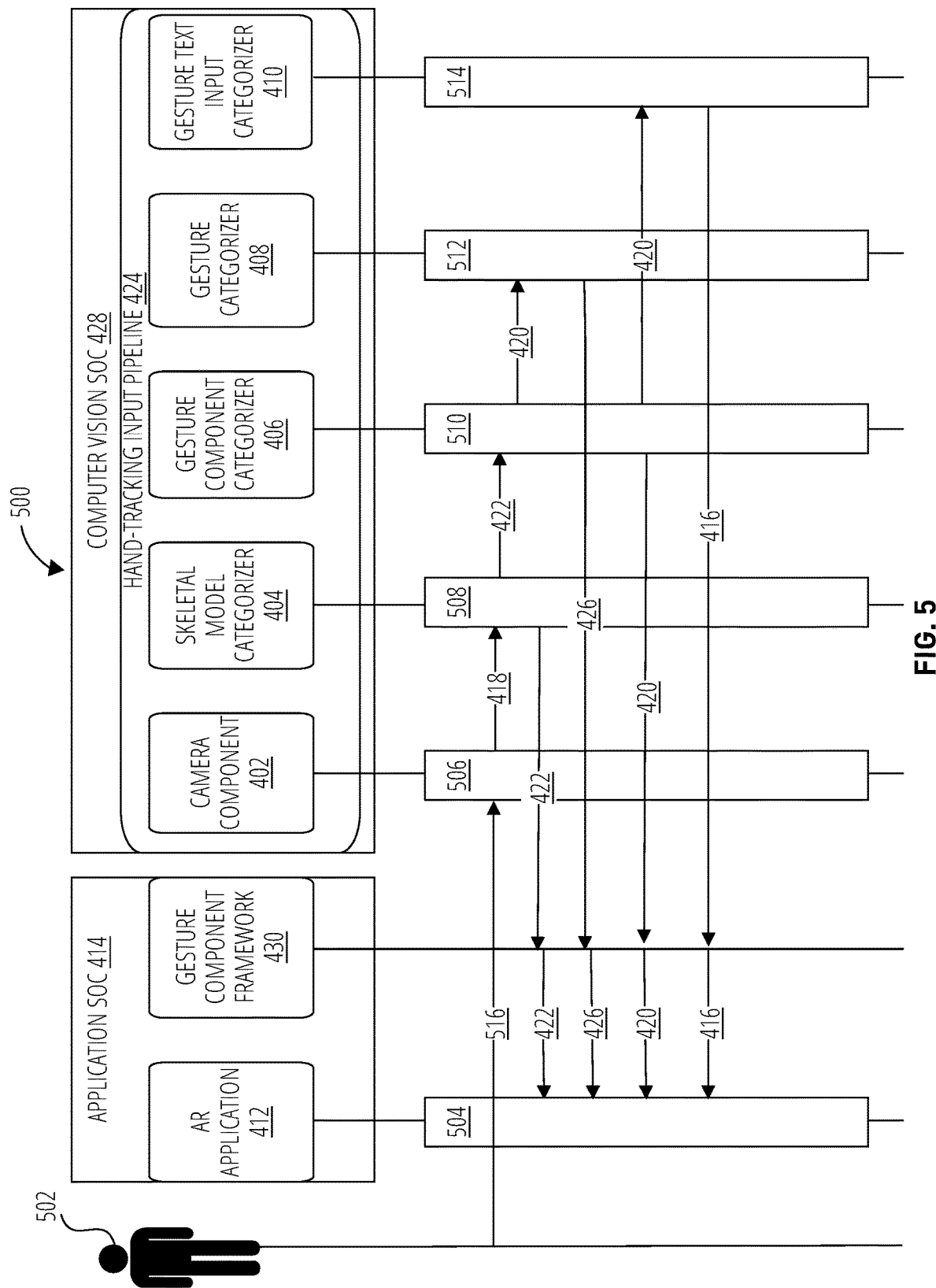
FIG. 5 is a sequence diagram of an AR gesture application process used by an AR system to provide an AR application to a user in accordance with some examples.

FIG. 5 is a sequence diagram of an AR gesture application process 500 used by an AR system to provide an AR application 412 to a user 502 in accordance with some examples. The user 502 makes specified gestures intended as user inputs into the AR application 412 and the hand-tracking input pipeline 424 recognizes gesture components, gestures, and symbols based on the gestures as described herein with reference to FIG. 4A and provides the gesture components, gestures, and symbols to the AR application 412 as user inputs.

In process 504, the AR application 412 generates a user interface of the AR system and provides the user interface to the user 502. The user 502 makes gestures 516 intended as user inputs when interacting with the AR application 412.

In process 506, a camera component 402 of the hand-tracking input pipeline 424, such as camera 114 and/or camera 116 of FIG. 1, captures video frame data of the gestures 516 and generates tracking video frame data 418 based on the captured video frame data. The camera component 402 communicates the tracking video frame data 418 to a skeletal model categorizer 404 of the hand-tracking input pipeline 424. In some examples, the camera component 402 communicates the tracking video frame data 418 to the skeletal model categorizer 404 using a shared memory buffer.

In process 508, the skeletal model categorizer 404 receives the tracking video frame data 418 from the camera component 402 and generates skeletal model data 422 based on the tracking video frame data 418 as more fully described herein with reference to FIG. 4A. The skeletal model categorizer 404 communicates the skeletal model data 422 to the to a gesture component categorizer 406 of the hand-tracking input pipeline 424. In some examples, the skeletal model categorizer 404 communicates the skeletal model data 422 to the gesture component categorizer 406 using a shared memory buffer.

In some examples, the skeletal model categorizer 404 communicates the skeletal model data 422 to the AR application 412 in accordance with an API of the gesture component framework 430. In process 504, the AR application 412 receives the skeletal model data 422 and uses the skeletal model data 422 as user input. For example, the AR application 412 presents a user interface to the user that receives specific gestures made by the user 502 as user inputs. The AR application 412 receives and utilizes the skeletal model data 422 as user input data into the user interface being provided by the AR application 412.

In process 510, the gesture component categorizer 406 receives the skeletal model data 422 from the skeletal model categorizer 404 and generates gesture component data 420 based on the skeletal model data 422 as more fully described herein with reference to FIG. 4A. The gesture component categorizer 406 communicates the gesture component data 420 to a gesture categorizer 408 and a gesture text input categorizer 410. In some examples, the gesture component categorizer 406 communicates the gesture component data 420 to components of the AR system using an IPC protocol.

In some examples, the gesture component categorizer 406 communicates the gesture component data 420 to the AR application 412 in accordance with an API of the gesture component framework 430. In process 504, the AR application 412 receives the gesture component data 420 and uses the gesture component data 420 as user input. For example, the AR application 412 presents a user interface to the user that receives specific gestures made by the user 502 as user inputs. The AR application 412 receives and utilizes the gesture component data 420 as user input data into the user interface being provided by the AR application 412.

In process 512, the gesture categorizer 408 receives the gesture component data 420 and determines gesture input event data 426 based on the gesture component data 420 as more fully described herein with reference to FIG. 4A. The gesture categorizer 408 communicates the gesture input event data 426 to the AR application 412 in accordance with an API of the gesture component framework 430. In some examples, the gesture categorizer 408 communicates the gesture input event data 426 to other components of the AR system using an IPC protocol creating a communications bridge between the computer vision SoC 428 and the application SoC 414.

In process 504, the AR application 412 receives the gesture input event data 426 and uses the gesture input event data 426 as user input. For example, the AR application 412 presents a user interface to the user that receives specific gestures made by the user 502 as user inputs. The AR application 412 receives and utilizes the gesture input event data 426 as user input data into the user interface being provided by the AR application 412.

In process 514, the gesture text input categorizer 410 receives the gesture component data 420 and generates symbol input event data 416 based on the gesture component data 420 as more fully described herein with reference to FIG. 4A. The gesture text input categorizer 410 communicates the symbol input event data 416 to the AR application 412 in accordance with an API of the gesture component framework 430.

Figure 6:
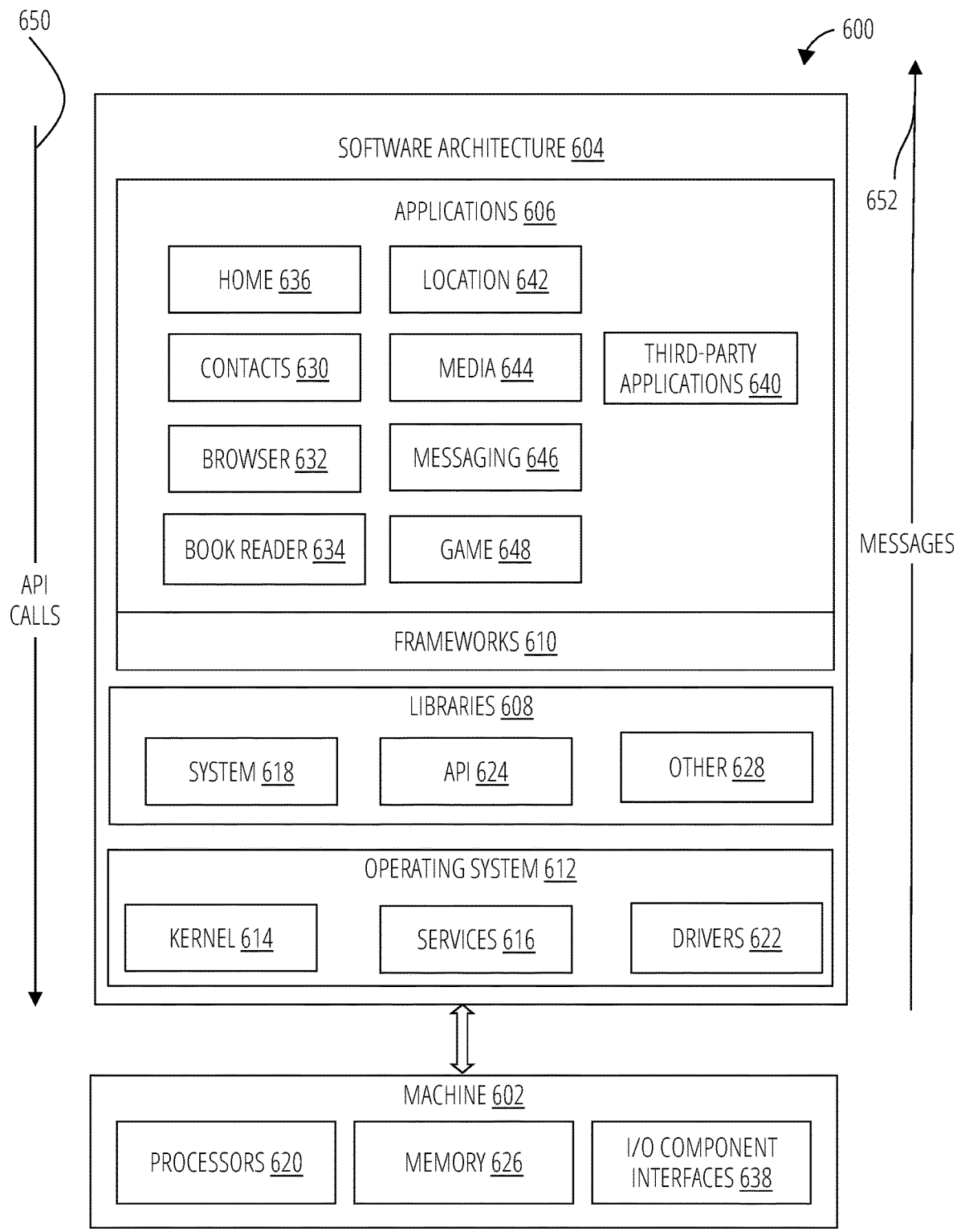
FIG. 6 is a block diagram showing a software architecture within which the present disclosure may be implemented, in accordance with some examples.

FIG. 6 is a block diagram 600 illustrating a software architecture 604, which can be installed on any one or more of the devices described herein. The software architecture 604 is supported by hardware such as a machine 602 that includes processors 620, memory 626, and I/O component interfaces 638. In this example, the software architecture 604 can be conceptualized as a stack of layers, where individual layers provide a particular functionality. The software architecture 604 includes layers such as an operating system 612, libraries 608, frameworks 610, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 608 provide a low-level common infrastructure used by the applications 606. The libraries 608 can include system libraries 618 (e.g., C standard library) that provide functions such as memory allocation functions, string manipulation functions, mathematic functions, and the like. In addition, the libraries 608 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g. OpenIMAJ), database libraries (e.g., SQLite to provide various relational database functions), web libraries (e.g., WebKit to provide web browsing functionality), and the like. The libraries 608 can also include a wide variety of other libraries 628 to provide many other APIs to the applications 606.

The frameworks 610 provide a high-level common infrastructure that is used by the applications 606. For example, the frameworks 610 provide various graphical user interface (GUI) functions, high-level resource management, and high-level location services. The frameworks 610 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
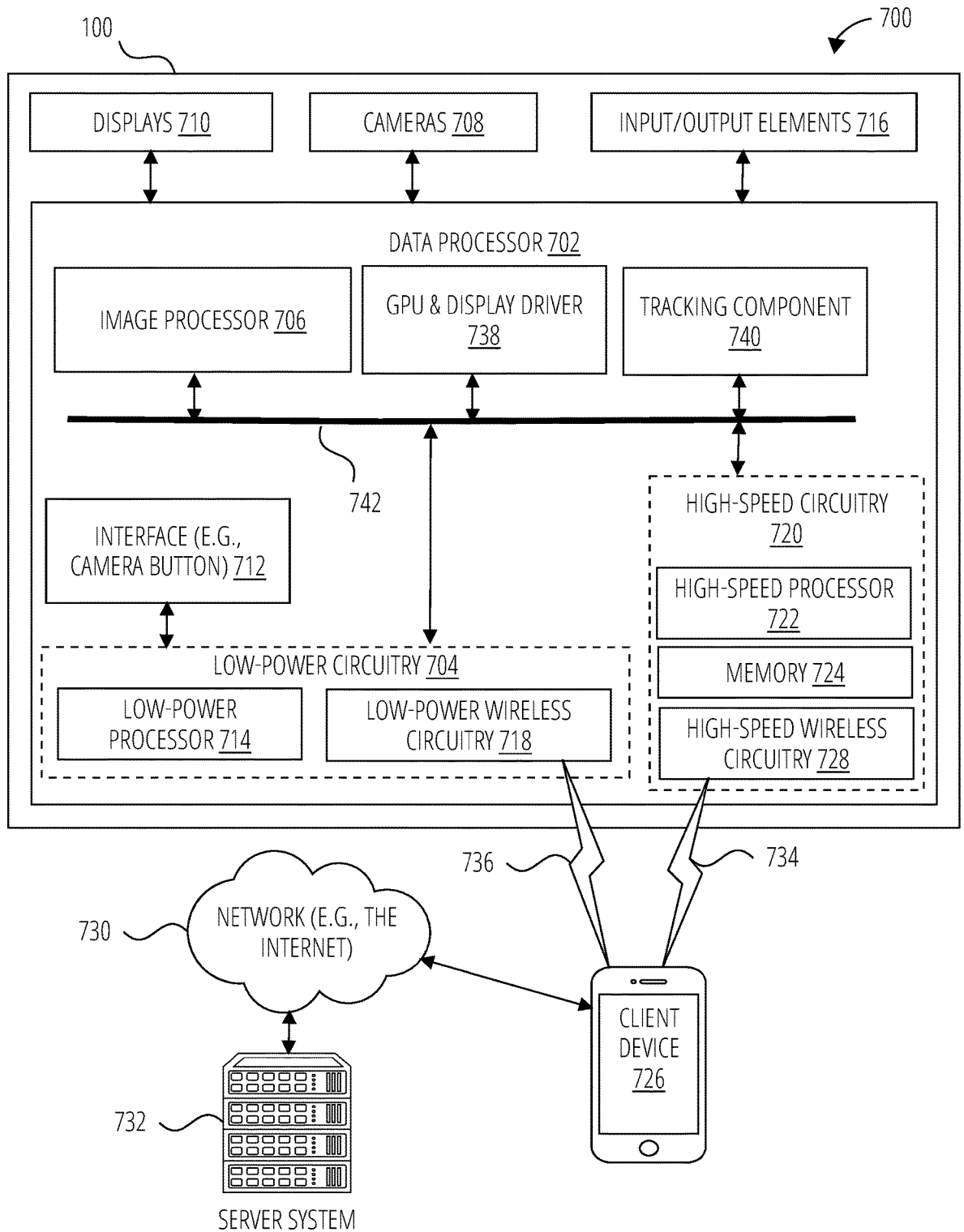
FIG. 7 is a block diagram illustrating a networked system including details of a head-worn AR system, in accordance with some examples.

FIG. 7 is a block diagram illustrating a networked system 700 including details of the glasses 100, in accordance with some examples. The networked system 700 includes the glasses 100, a client device 726, and a server system 732. The client device 726 may be a smartphone, tablet, phablet, laptop computer, access point, or any other such device capable of connecting with the glasses 100 using a low-power wireless connection 736 and/or a high-speed wireless connection 734. The client device 726 is connected to the server system 732 via the network 730. The network 730 may include any combination of wired and wireless connections. The server system 732 may be one or more computing devices as part of a service or network computing system. The client device 726 and any elements of the server system 732 and network 730 may be implemented using details of the software architecture 604 or the machine 300 described in FIG. 6 and FIG. 3 respectively.

The glasses 100 include a data processor 702, displays 710, one or more cameras 708, and additional input/output elements 716. The input/output elements 716 may include microphones, audio speakers, biometric sensors, additional sensors, or additional display elements integrated with the data processor 702. Examples of the input/output elements 716 are discussed further with respect to FIG. 6 and FIG. 3. For example, the input/output elements 716 may include any of I/O device interfaces 306 including output component interfaces 328, motion component interfaces 336, and so forth. Examples of the displays 710 are discussed in FIG. 2. In the particular examples described herein, the displays 710 include a display for the user's left and right eyes.

The data processor 702 includes an image processor 706 (e.g., a video processor), a GPU & display driver 738, a tracking component 740, an interface 712, low-power circuitry 704, and high-speed circuitry 720. The components of the data processor 702 are interconnected by a bus 742.

The interface 712 refers to any source of a user command that is provided to the data processor 702. In one or more examples, the interface 712 is a physical button that, when depressed, sends a user input signal from the interface 712 to a low-power processor 714. A depression of such button followed by an immediate release may be processed by the low-power processor 714 as a request to capture a single image, or vice versa. A depression of such a button for a first period of time may be processed by the low-power processor 714 as a request to capture video data while the button is depressed, and to cease video capture when the button is released, with the video captured while the button was depressed stored as a single video file. Alternatively, depression of a button for an extended period of time may capture a still image. In some examples, the interface 712 may be any mechanical switch or physical interface capable of accepting user inputs associated with a request for data from the cameras 708. In other examples, the interface 712 may have a software component, or may be associated with a command received wirelessly from another source, such as from the client device 726.

The image processor 706 includes circuitry to receive signals from the cameras 708 and process those signals from the cameras 708 into a format suitable for storage in the memory 724 or for transmission to the client device 726. In one or more examples, the image processor 706 (e.g., video processor) comprises a microprocessor integrated circuit (IC) customized for processing sensor data from the cameras 708, along with volatile memory used by the microprocessor in operation.

The low-power circuitry 704 includes the low-power processor 714 and the low-power wireless circuitry 718. These elements of the low-power circuitry 704 may be implemented as separate elements or may be implemented on a single IC as part of a system on a single chip. The low-power processor 714 includes logic for managing the other elements of the glasses 100. As described above, for example, the low-power processor 714 may accept user input signals from the interface 712. The low-power processor 714 may also be configured to receive input signals or instruction communications from the client device 726 via the low-power wireless connection 736. The low-power wireless circuitry 718 includes circuit elements for implementing a low-power wireless communication system. Bluetooth™ Smart, also known as Bluetooth™ low energy, is one standard implementation of a low power wireless communication system that may be used to implement the low-power wireless circuitry 718. In other examples, other low power communication systems may be used.

The high-speed circuitry 720 includes a high-speed processor 722, a memory 724, and a high-speed wireless circuitry 728. The high-speed processor 722 may be any processor capable of managing high-speed communications and operation of any general computing system used for the data processor 702. The high-speed processor 722 includes processing resources used for managing high-speed data transfers on the high-speed wireless connection 734 using the high-speed wireless circuitry 728. In some examples, the high-speed processor 722 executes an operating system such as a LINUX operating system or other such operating system such as the operating system 612 of FIG. 6. In addition to any other responsibilities, the high-speed processor 722 executing a software architecture for the data processor 702 is used to manage data transfers with the high-speed wireless circuitry 728. In some examples, the high-speed wireless circuitry 728 is configured to implement Institute of Electrical and Electronic Engineers (IEEE) 802.11 communication standards, also referred to herein as Wi-Fi. In other examples, other high-speed communications standards may be implemented by the high-speed wireless circuitry 728.

The memory 724 includes any storage device capable of storing camera data generated by the cameras 708 and the image processor 706. While the memory 724 is shown as integrated with the high-speed circuitry 720, in other examples, the memory 724 may be an independent stand-alone element of the data processor 702. In some such examples, electrical routing lines may provide a connection through a chip that includes the high-speed processor 722 from image processor 706 or the low-power processor 714 to the memory 724. In other examples, the high-speed processor 722 may manage addressing of the memory 724 such that the low-power processor 714 will boot the high-speed processor 722 any time that a read or write operation involving the memory 724 is desired.

The tracking component 740 estimates a pose of the glasses 100. For example, the tracking component 740 uses image data and associated inertial data from the cameras 708 and the position component interfaces 340, as well as GPS data, to track a location and determine a pose of the glasses 100 relative to a frame of reference (e.g., real-world scene environment). The tracking component 740 continually gathers and uses updated sensor data describing movements of the glasses 100 to determine updated three-dimensional poses of the glasses 100 that indicate changes in the relative position and orientation relative to physical objects in the real-world scene environment. The tracking component 740 permits visual placement of virtual objects relative to physical objects by the glasses 100 within the field of view of the user via the displays 710.

The GPU & display driver 738 may use the pose of the glasses 100 to generate frames of virtual content or other content to be presented on the displays 710 when the glasses 100 are functioning in a traditional augmented reality mode. In this mode, the GPU & display driver 738 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 726, or on a remote server. For example, one or more functions or operations described herein may be performed by one of the applications 606 such as messaging application 646.

Figure 8:
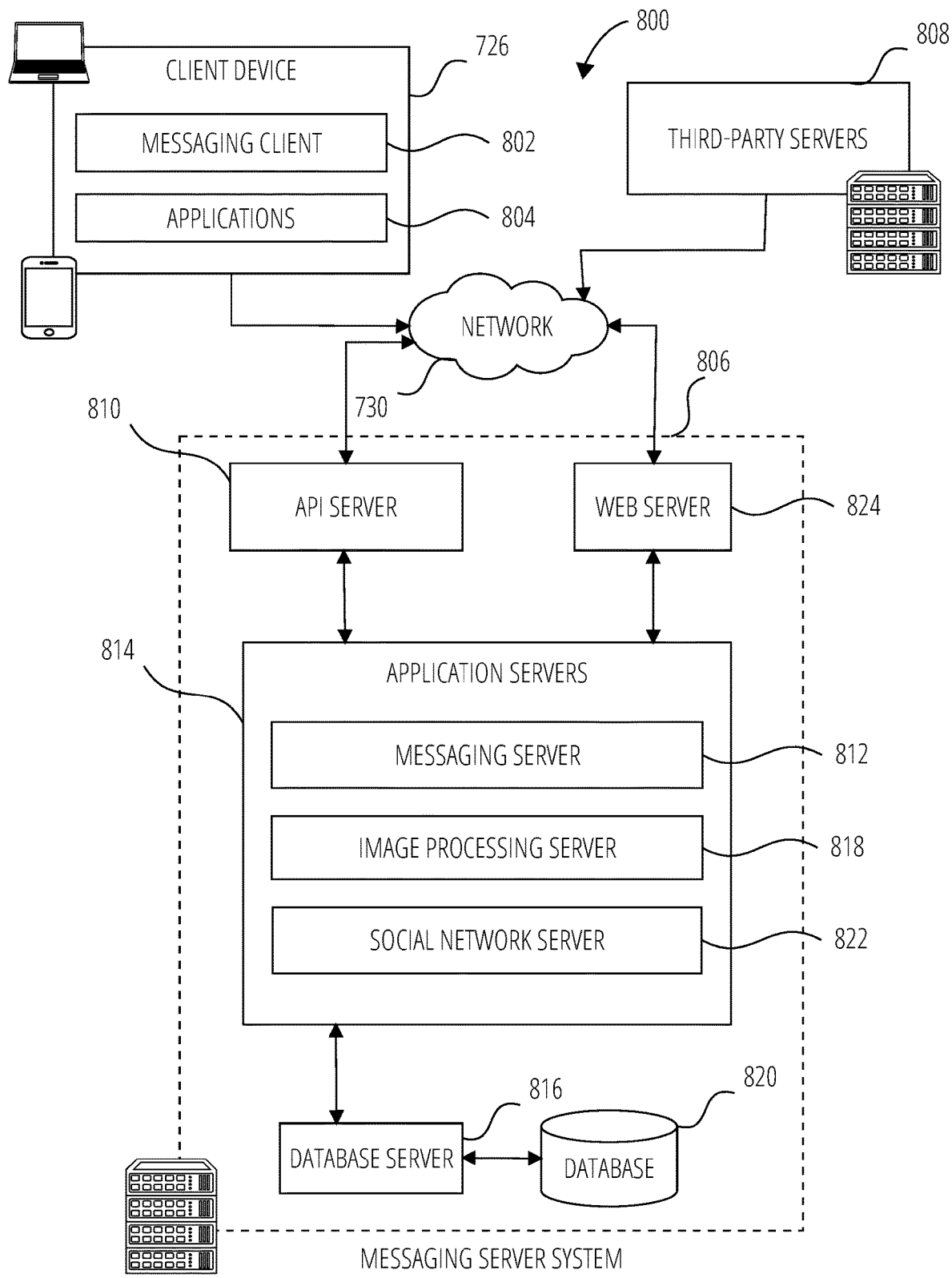
FIG. 8 is a block diagram showing an example messaging system for exchanging data (e.g., messages and associated content) over a network in accordance with some examples

FIG. 8 is a block diagram showing an example messaging system 800 for exchanging data (e.g., messages and associated content) over a network. The messaging system 800 includes multiple instances of a client device 726 which host a number of applications, including a messaging client 802 and other applications 804. A messaging client 802 is communicatively coupled to other instances of the messaging client 802 (e.g., hosted on respective other client devices 726), a messaging server system 806 and third-party servers 808 via a network 730 (e.g., the Internet). A messaging client 802 can also communicate with locally hosted applications 804 using Application Program Interfaces (APIs).

A messaging client 802 is able to communicate and exchange data with other messaging clients 802 and with the messaging server system 806 via the network 730. The data exchanged between messaging clients 802, and between a messaging client 802 and the messaging server system 806, includes functions (e.g., commands to invoke functions) as well as payload data (e.g., text, audio, video or other multimedia data).

The messaging server system 806 provides server-side functionality via the network 730 to a particular messaging client 802. While some functions of the messaging system 800 are described herein as being performed by either a messaging client 802 or by the messaging server system 806, the location of some functionality either within the messaging client 802 or the messaging server system 806 may be a design choice. For example, it may be technically preferable to initially deploy some technology and functionality within the messaging server system 806 but to later migrate this technology and functionality to the messaging client 802 where a client device 726 has sufficient processing capacity.

The messaging server system 806 supports various services and operations that are provided to the messaging client 802. Such operations include transmitting data to, receiving data from, and processing data generated by the messaging client 802. This data may include message content, client device information, geolocation information, media augmentation and overlays, message content persistence conditions, social network information, and live event information, as examples. Data exchanges within the messaging system 800 are invoked and controlled through functions available via user interfaces (UIs) of the messaging client 802.

Turning now specifically to the messaging server system 806, an Application Program Interface (API) server 810 is coupled to, and provides a programmatic interface to, application servers 814. The application servers 814 are communicatively coupled to a database server 816, which facilitates access to a database 820 that stores data associated with messages processed by the application servers 814. Similarly, a web server 824 is coupled to the application servers 814, and provides web-based interfaces to the application servers 814. To this end, the web server 824 processes incoming network requests over the Hypertext Transfer Protocol (HTTP) and several other related protocols.

The Application Program Interface (API) server 810 receives and transmits message data (e.g., commands and message payloads) between the client device 726 and the application servers 814. Specifically, the Application Program Interface (API) server 810 provides a set of interfaces (e.g., routines and protocols) that can be called or queried by the messaging client 802 in order to invoke functionality of the application servers 814. The Application Program Interface (API) server 810 exposes various functions supported by the application servers 814, including account registration, login functionality, the sending of messages, via the application servers 814, from a particular messaging client 802 to another messaging client 802, the sending of media files (e.g., images or video) from a messaging client 802 to a messaging server 812, and for possible access by another messaging client 802, the settings of a collection of media data (e.g., story), the retrieval of a list of friends of a user of a client device 726, the retrieval of such collections, the retrieval of messages and content, the addition and deletion of entities (e.g., friends) to an entity graph (e.g., a social graph), the location of friends within a social graph, and opening an application event (e.g., relating to the messaging client 802).

The application servers 814 host a number of server applications and subsystems, including for example a messaging server 812, an image processing server 818, and a social network server 822. The messaging server 812 implements a number of message processing technologies and functions, particularly related to the aggregation and other processing of content (e.g., textual and multimedia content) included in messages received from multiple instances of the messaging client 802. As will be described in further detail, the text and media content from multiple sources may be aggregated into collections of content (e.g., called stories or galleries). These collections are then made available to the messaging client 802. Other processor and memory intensive processing of data may also be performed server-side by the messaging server 812, in view of the hardware requirements for such processing.

The application servers 814 also include an image processing server 818 that is dedicated to performing various image processing operations, typically with respect to images or video within the payload of a message sent from or received at the messaging server 812.

The social network server 822 supports various social networking functions and services and makes these functions and services available to the messaging server 812. To this end, the social network server 822 maintains and accesses an entity graph within the database 820. Examples of functions and services supported by the social network server 822 include the identification of other users of the messaging system 800 with which a particular user has relationships or is "following," and also the identification of other entities and interests of a particular user.

The messaging client 802 can notify a user of the client device 726, or other users related to such a user (e.g., "friends"), of activity taking place in shared or shareable sessions. For example, the messaging client 802 can provide participants in a conversation (e.g., a chat session) in the messaging client 802 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "machine-readable medium" refers to both machine-storage media and transmission media. Thus, the terms include both storage devices/media and carrier waves/modulated data signals. The terms "machine-readable medium," "machine-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method, comprising:
generating, by one or more processors using a camera component of an Augmented Reality (AR) system, real-world scene environment frame data of a gesture being made by a user of the AR system;
generating, by the one or more processors, skeletal model data using the real-world scene environment frame data;
recognizing, by the one or more processors, a group of symmetry gesture components in the skeletal model data, the group of symmetry gesture components including one or more aggregate gesture components of the skeletal model data recognized on a basis of aggregating multiple gesture components in a temporal segment interval of the skeletal model data, the symmetry gesture components composed of symmetry features defining a metric of how precisely a first hand shape of a first hand is a reflection of a second hand shape of a second hand;
recognizing, by the one or more processors, a handshape using the group of symmetry gesture components and a defined subset of a set of possible handshapes where the defined subset of possible handshapes is based on a use case;
identifying, by the one or more processors, a symbol based on the handshape; and
utilizing, by the one or more processors, the symbol as user input in a user interface of an application of the AR system.

2. The computer-implemented method of claim 1, wherein the group of gesture components are handshape gesture components composed of handshape features of the skeletal model data.

3. The computer-implemented method of claim 2, wherein the handshape gesture components include one or more handshape features composed of redundant features of the skeletal model data.

4. The computer-implemented method of claim 1, wherein the group of gesture components include one or more rotation gesture components composed of a rotation marker of a hand of the user.

5. The computer-implemented method of claim 1, wherein the group of gesture components include one or more delta motion gesture components composed of a delta motion marker describing an amount of a rotation of a handshape.

6. The computer-implemented method of claim 1, wherein the AR system comprises a head-worn device.

7. A machine comprising:
one or more processors; and
a memory storing instructions that, when executed by the one or more processors, cause the machine to perform operations comprising:
generating, using a camera component of an AR system, real-world scene environment frame data of a gesture being made by a user of the AR system;
generating skeletal model data using the real-world scene environment frame data;
recognizing a group of symmetry gesture components in the skeletal model data, the group of symmetry gesture components including one or more aggregate gesture components of the skeletal model data recognized on a basis of aggregating multiple gesture components in a temporal segment interval of the skeletal model data, the symmetry gesture components composed of symmetry features defining a metric of how precisely a first hand shape of a first hand is a reflection of a second hand shape of a second hand;

recognizing a handshape using the group of symmetry gesture components and a defined subset of a set of possible handshapes where the defined subset of possible handshapes is based on a use case;

identifying a symbol based on the handshape; and utilizing the symbol as user input in a user interface of an application of the AR system.

8. The machine of claim 7, wherein the group of gesture components are handshape gesture components composed of handshape features in the skeletal model data.

9. The machine of claim 8, wherein the handshape gesture components include one or more handshape features composed of redundant features in the skeletal model data.

10. The machine of claim 7, wherein the group of gesture components include one or more rotation gesture components composed of a rotation marker of a hand of the user.

11. The machine of claim 7, wherein the group of gesture components include one or more delta motion gesture components composed of a delta motion marker describing an amount of a rotation of a handshape.

12. The machine of claim 7, wherein the AR system comprises a head-worn device.

13. A non-transitory machine-readable storage medium, the machine-readable storage medium including instructions that, when executed by one or more processors, cause a computer to perform operations comprising:

generating, using a camera component of an Augmented Reality (AR) system, real-world scene environment frame data of a gesture being made by a user of the AR system;

generating skeletal model data using the real-world scene environment frame data;

recognizing a group of symmetry gesture components in the skeletal model data, the group of symmetry gesture components including one or more aggregate gesture components of the skeletal model data recognized on a basis of aggregating multiple gesture components in a temporal segment interval of the skeletal model data, the symmetry gesture components composed of symmetry features defining a metric of how precisely a first hand shape of a first hand is a reflection of a second hand shape of a second hand;

recognizing a handshape using the group of symmetry gesture components and a defined subset of a set of possible handshapes where the defined subset of possible handshapes is based on a use case;

identifying a symbol based on the handshape; and utilizing the symbol as user input in a user interface of an application of the AR system.

14. The non-transitory machine-readable storage medium of claim 13, wherein the group of gesture components are handshape gesture components composed of handshape features in the skeletal model data.

15. The non-transitory machine-readable storage medium of claim 14, wherein the handshape gesture components include one or more handshape features composed of redundant features in the skeletal model data.

16. The non-transitory machine-readable storage medium of claim 13, wherein the group of gesture components include one or more rotation gesture components composed of a rotation marker of a hand of the user.

17. The non-transitory machine-readable storage medium of claim 13, wherein the group of gesture components include one or more delta motion gesture components composed of a delta motion marker describing an amount of a rotation of a handshape.

* * * * *